US012630304B2

(12) United States Patent
Williams et al.

(10) Patent No.: US 12,630,304 B2
(45) Date of Patent: May 19, 2026

(54) STRAP PACK SUPPORT TOOL FOR HELICOPTER MAINTENANCE

(71) Applicant: United States of America as Represented by the Secretary of the Army, Washington, DC (US)

(72) Inventors: Joshua M. Williams, Huntsville, AL (US); Wyatt D. Walsh, Lacey Spring, AL (US); Thomas J. Dupuy, Madison, AL (US)

(73) Assignee: United States of America as represented by the secretary of the Army, Washington, DC (US)

( * ) Notice: Subject to any disclaimer, the term of this patent is extended or adjusted under 35 U.S.C. 154(b) by 57 days.

(21) Appl. No.: 18/925,160

(22) Filed: Oct. 24, 2024

(65) Prior Publication Data

US 2026/0116579 A1 Apr. 30, 2026

(51) Int. Cl.
B64F 5/40 (2017.01)

(52) U.S. Cl.
CPC ..................................... B64F 5/40 (2017.01)

(58) Field of Classification Search
CPC ........................................................ B64F 5/40
USPC ........................................................ 248/544
See application file for complete search history.

(56) References Cited

U.S. PATENT DOCUMENTS

| | | | | | |
|---|---|---|---|---|---|
| 4,422,757 | A | * | 12/1983 | Munski | B64C 27/008 |
| | | | | | 356/138 |
| 5,952,836 | A | * | 9/1999 | Haake | G01R 31/54 |
| | | | | | 416/61 |
| 8,235,324 | B1 | * | 8/2012 | Birch | B64C 27/68 |
| | | | | | 244/17.25 |
| 8,500,407 | B1 | * | 8/2013 | Kennedy | B64C 27/48 |
| | | | | | 416/209 |
| 10,287,007 | B2 | * | 5/2019 | Thomas | B64C 27/78 |
| 11,130,009 | B2 | * | 9/2021 | Thornton | A62B 35/0043 |
| 11,427,352 | B2 | * | 8/2022 | Estevo, Jr. | B64F 5/40 |
| 11,846,341 | B2 | * | 12/2023 | Ito | B64C 13/24 |
| 12,138,758 | B2 | * | 11/2024 | Arakeri | B25B 27/023 |
| 2021/0309390 | A1 | * | 10/2021 | Lofstrom | B64F 5/40 |

* cited by examiner

*Primary Examiner* — Eret C McNichols
(74) *Attorney, Agent, or Firm* — Michael K. Gray

(57) ABSTRACT

A strap pack tool is used to support a strap pack of a helicopter to allow easier, quicker and safer maintenance of rotor hub components. This is accomplished by a cylindrical hub extending upward from a main body of the strap pack tool for engaging the blade-root end of the strap pack. Side appendages connected to the main body are provided with arms having support platforms and respective hubs for engaging the disconnected ends of rotor dampers. An interior wall located within the main body forms a cavity for engaging a raised lip of a lower flange of a strap pack housing. The tool is made of thermoplastic material with the interior of the tool being of honeycomb construction with solid I-beams providing structural support to the arms.

19 Claims, 15 Drawing Sheets

400

STRAP PACK SUPPORT TOOL FOR HELICOPTER MAINTENANCE

GOVERNMENT RIGHTS

All rights in the Invention have been assigned to the U.S. Government.

BACKGROUND OF THE INVENTION

1. Field of Invention

The present invention pertains to maintenance tools for use on helicopters. In particular, the present invention pertains to a strap pack support tool that supports a helicopter strap pack to enable quick and safe maintenance of mechanical components associated with a helicopter rotor blade and main rotor head.

2. Discussion of the Background

Performing maintenance on rotary aircraft can require partial disassembly of the components connecting to the main rotor head (MRH). The strap pack of a helicopter connects to and supports the load between the main rotor hub and the root of a rotor blade. Damper rods serve to reduce or dampen rotor blade vibrational effects. When the rotor blades are disconnected for maintenance operations, the strap pack and damper rods have a propensity to perilously dangle. Sudden movement or overextension of these heavy items can cause damage to other components and injury to repair technicians. Accordingly, the strap pack and damper rods need to be supported and contained while maintenance is performed. Traditionally, the method for such support has been to secure the strap pack and damper rods by employing a rag-tag assemblage of lumber, foam and rope. Such an approach is inefficient, inconsistent, and requires significant manual manipulation of heavy MRH components.

SUMMARY OF THE INVENTION

A strap pack tool for helicopter maintenance has a cylindrically shaped main body having a top circular platform from which a hub extends in an upward direction, with the hub being centered on a center axis. A first side appendage is connected to the main body and a first support arm extends from the side appendage. A first arm platform is located at an end of the first arm and connects to a first arm hub that extends in the upward direction. In like manner, a second side appendage is connected to an opposite side of the main body such that the second appendage section is oriented 180 degrees opposite to that of the first appendage section. A second arm platform is positioned at an end of said second support arm. The second arm platform connects to a second arm hub that extends in the upward direction.

A first reinforcing wall connects the side of the main body to the first support arm and a second reinforcing wall connects the side of the main body to the second support arm. The first reinforcing wall connects to a first valley region having a top surface or shell which is parallel to the bottom of the first side appendage. The second reinforcing wall connects to a second valley region having a top surface or shell which is parallel to the bottom of the second side appendage. The top surface of the first valley region and the top surface of the second valley region lie in a first plane and the bottom of the first side appendage and the bottom of the second side appendage lie in a second plane.

An interior main cylindrical wall forms a main cylindrical cavity within the main body of the strap pack tool. Within the main cylindrical cavity is a cylindrical sleeve. A gap is positioned radially outward from the cylindrical sleeve and radially inward from the main cylindrical wall.

An inner cylindrical cavity is formed by the cylindrical sleeve, with the inner cylindrical cavity being located radially inward from the cylindrical sleeve and forming an opening at the bottom of the strap pack tool.

The top of the cylindrical sleeve has a projection section that extends radially outward from and above the main cylindrical wall. The main cylindrical wall connects to a sloped wall (a circumferential sloped wall) that connects to a recessed wall (a circumferential recessed wall). The recessed wall is located radially outward from the main cylindrical wall and from a center axis, with the recessed wall being parallel to the center axis and the main cylindrical wall.

An interior roof positioned below the top circular platform forms a conical cavity that lies above and connects to the main cylindrical cavity that is formed by the main cylindrical wall. The upward movement of the cylindrical sleeve is limited by the bottom edge of the roof that contacts the projection section of the cylindrical sleeve when the cylindrical sleeve is in a fully extended upward position such as when the support tool is resting on a flat surface.

The downward movement of the cylindrical sleeve is limited by the projection section making contact with the sloped wall. The strap pack tool has a solid exterior shell, with the interior of the tool being honeycombed. For structural strength, the first and second arms have a solid I-beam or structural support member which extends from the respective arm hubs to the bottom of the respective side appendages, with the top of the I-beams being shaped to be accommodated within the respective arm hubs. When the strap pack tool lies on a flat surface the bottoms of the respective side appendages, the bottom of the main interior wall and the bottom of the cylindrical sleeve lie flush with the flat surface.

DESCRIPTION OF THE DRAWINGS

A more complete appreciation of the invention and many of the attendant advantages thereof will be readily obtained by reference to the following detailed description when considered in connection with the accompanying drawings.

DETAILED DESCRIPTION

Figure 1:
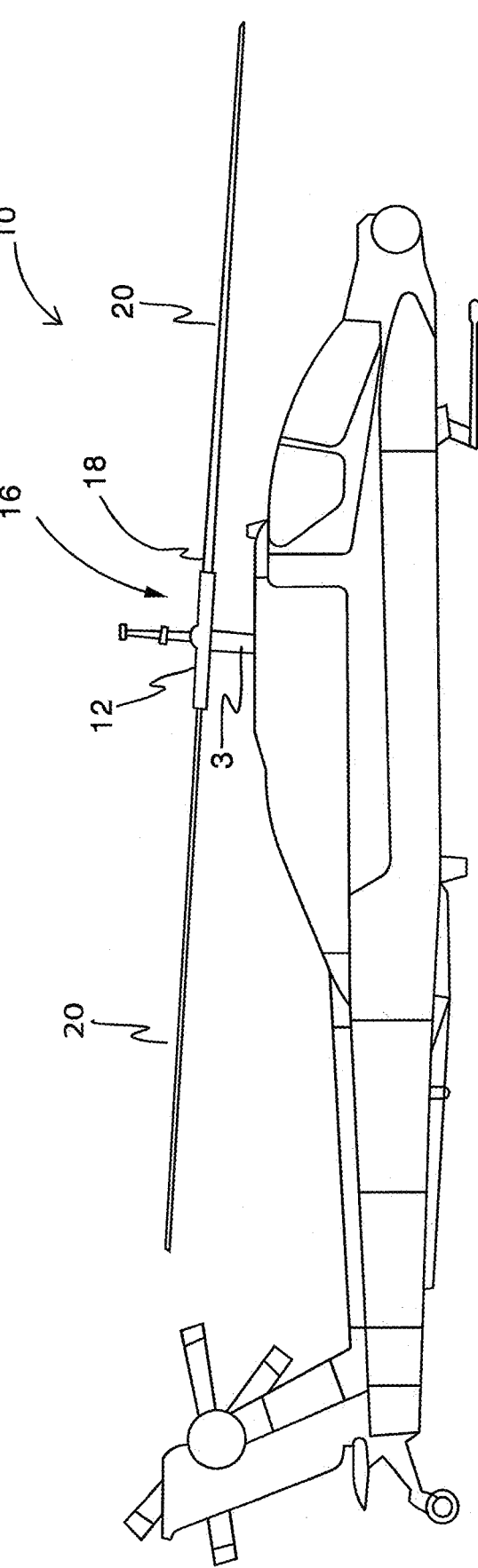
FIG. 1 is side view of a helicopter.

FIGS. 1, 2, 3 and 4 provide perspective and appreciation concerning how the invention is used. With reference to FIG. 1, a helicopter 10 has a main rotor hub 12 that connects to a drive shaft 14 with the main rotor hub 12 connecting to a blade connection assembly 16 that connects to the blade root 18 of a rotor blade 20.

Figure 2:
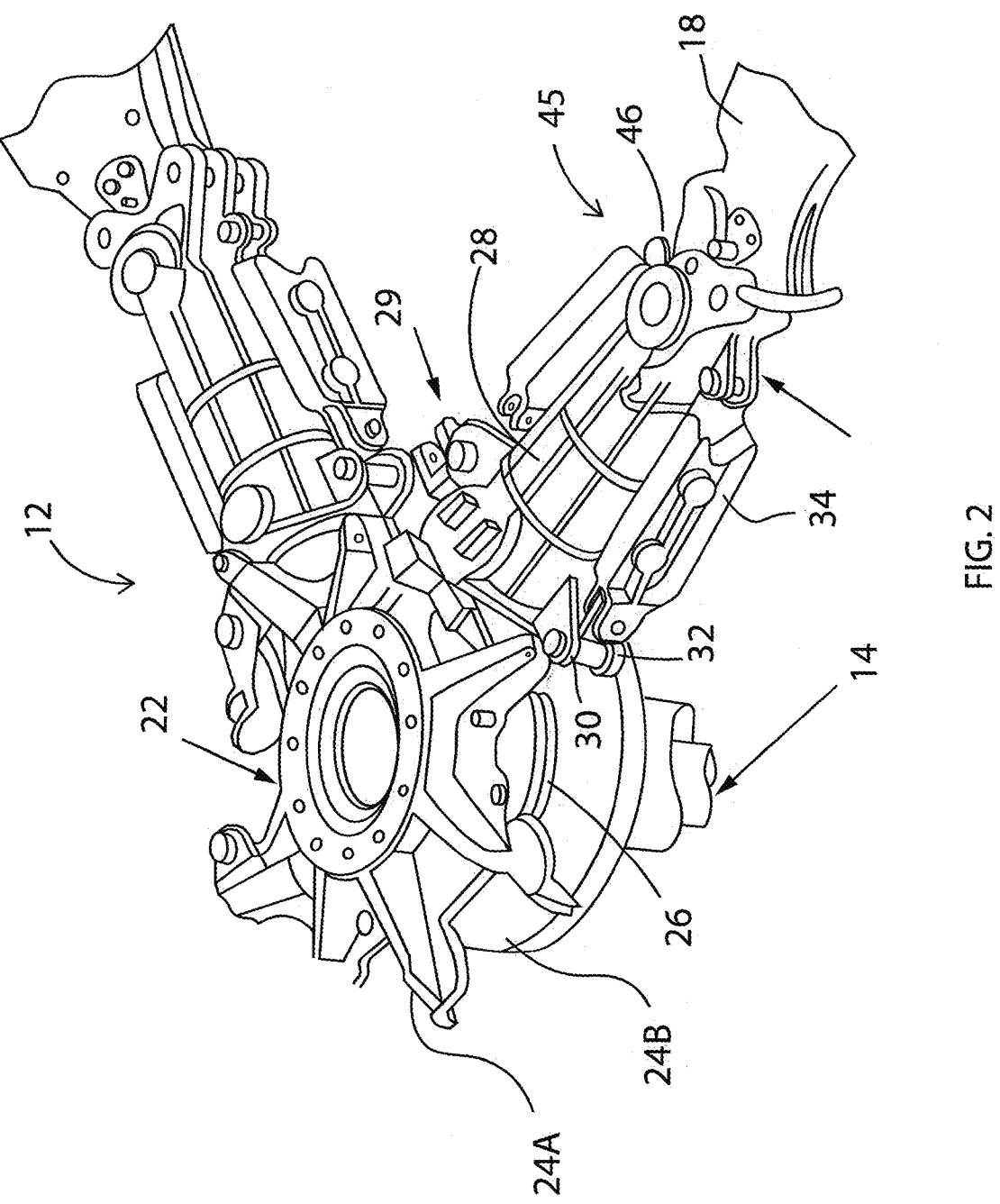
FIG. 2 is top perspective view of a helicopter rotor hub and associated components.
Figure 3:
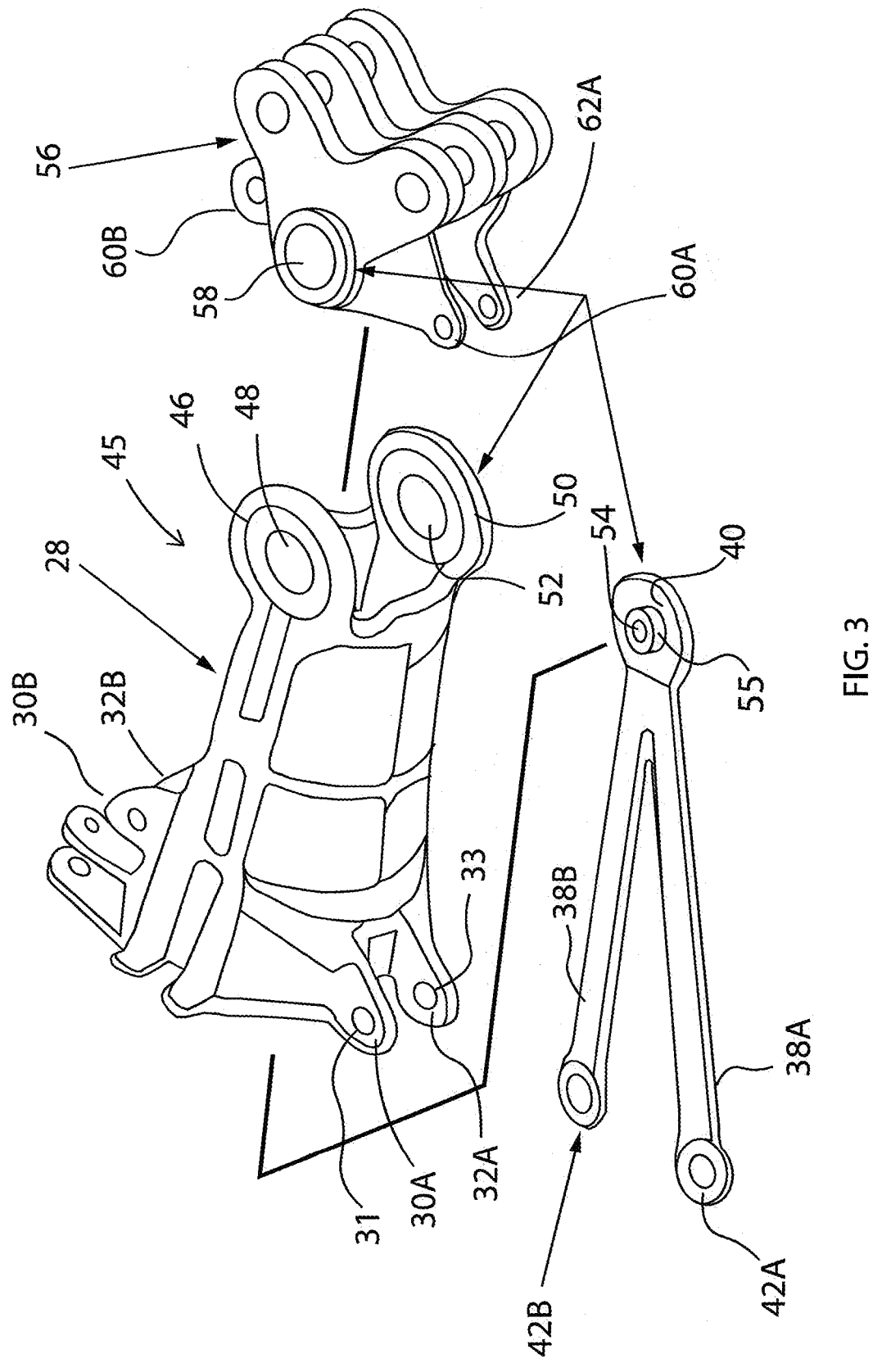
FIG. 3 is an exploded view of a strap pack housing, strap pack and securing shoe.

With reference to FIG. 2 and FIG. 3, a main rotor hub 12 has an upper hub ring 22 from which extend connecting arms 24A, 24B, etc., that connect to a hub plate 26 that is mechanically connected to strap pack housing 28. An upper lateral flange 30 and a lower lateral flange 32, are positioned at the hub connection side 29 of the strap pack housing 28. The upper lateral flange 30 and the lower lateral flange 32 have aligned apertures 31, 33 allowing for mechanical connection with a damper 34. The damper 34, extends radially away from the main rotor hub 12 and is positioned just to the outside of a lateral side of the strap pack housing 28.

In FIG. 3, the exploded view demonstrates that a strap pack 36 extends through the strap pack housing 28. The strap pack 36 is V-shaped having two arms 38A, 38B that connect to a vertex region 40.

Arms 38A, 38B have respective end regions 42A, 42B that have respective apertures 44A, 44B. At the blade-connection side 45 of the strap pack housing 28 are upper flange 46 having an aperture 48 and a lower flange 50 having an aperture 52. The vertex region 40 of the strap pack 36 has an aperture 54 defined by a raised lip 55 for axial alignment with aperture 48 of upper flange 46 and aperture 52 of lower flange 50.

The flange 46 and flange 50 form a clevis structure. A shoe 56 has a center aperture 58, with aperture 58 being axially aligned with aperture 54 of the strap pack vertex region 40 as well as aperture 48 of upper flange 46 and aperture 52, with aperture 52 formed by an upper extending lip 51 of lower flange 50.

Apertures 48, 52, 54 and 58 provide a path for the strap pack 36, strap pack housing 28, shoe 56 and blade root 18 to be bolted together. Also, shoe 56 has upper lateral apertures 60 and lower lateral apertures 62 that allow for a securely bolted connection with dampers 34.

Figure 4:
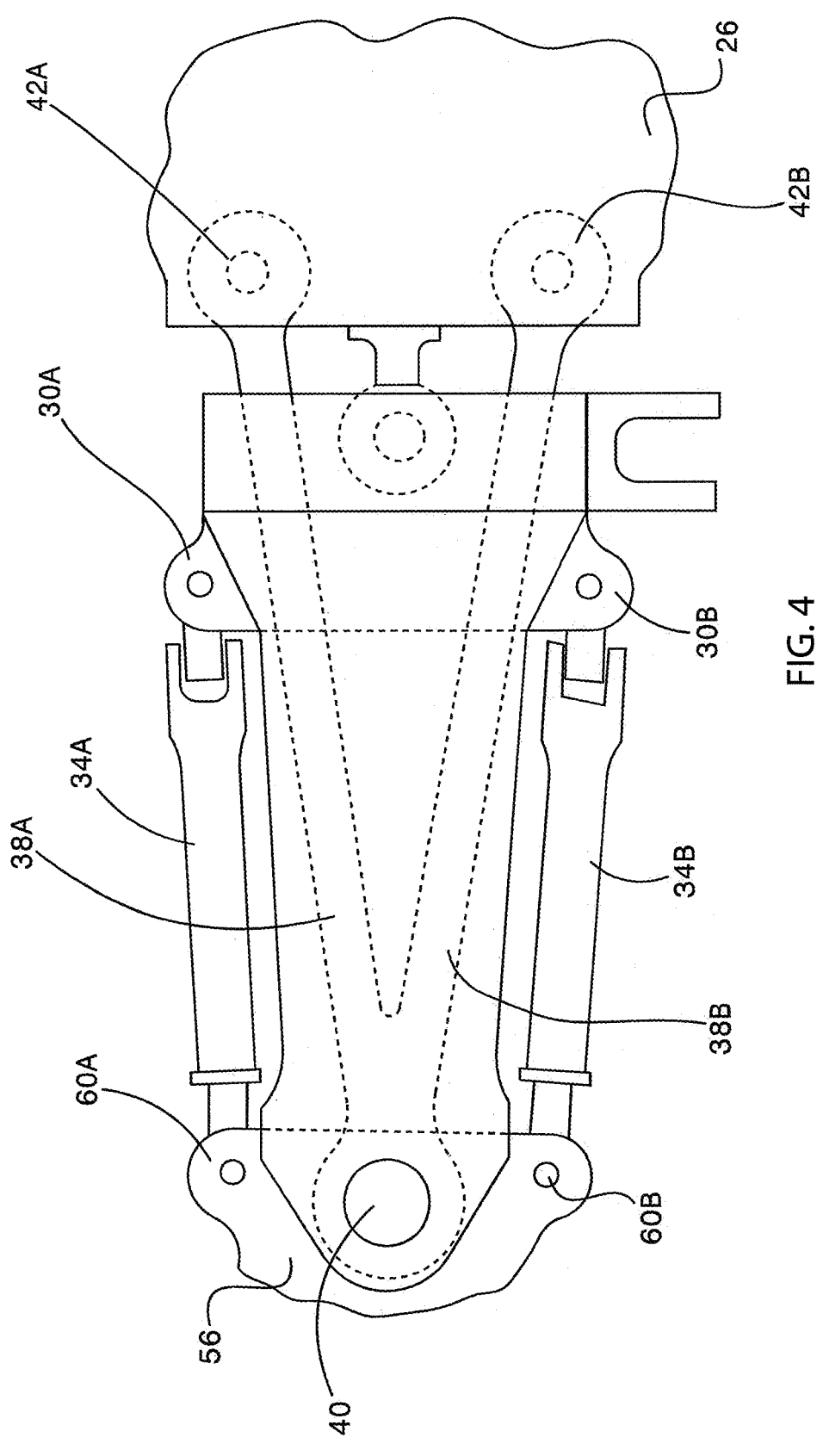
FIG. 4 is a top X-ray view of a strap pack and connecting components.

FIG. 4 provides an X-ray top view of the strap pack 36. Strap pack 36 has its arms 38A, 38B connected to the hub plate 26 of the main rotor hub 12. Damper 34A is connected to upper lateral flange 30A and to shoe 56 at the location of aperture 60A. Damper 34B is connected to upper lateral flange 30B and to shoe 56 at the location of aperture 60B.

Figure 5:
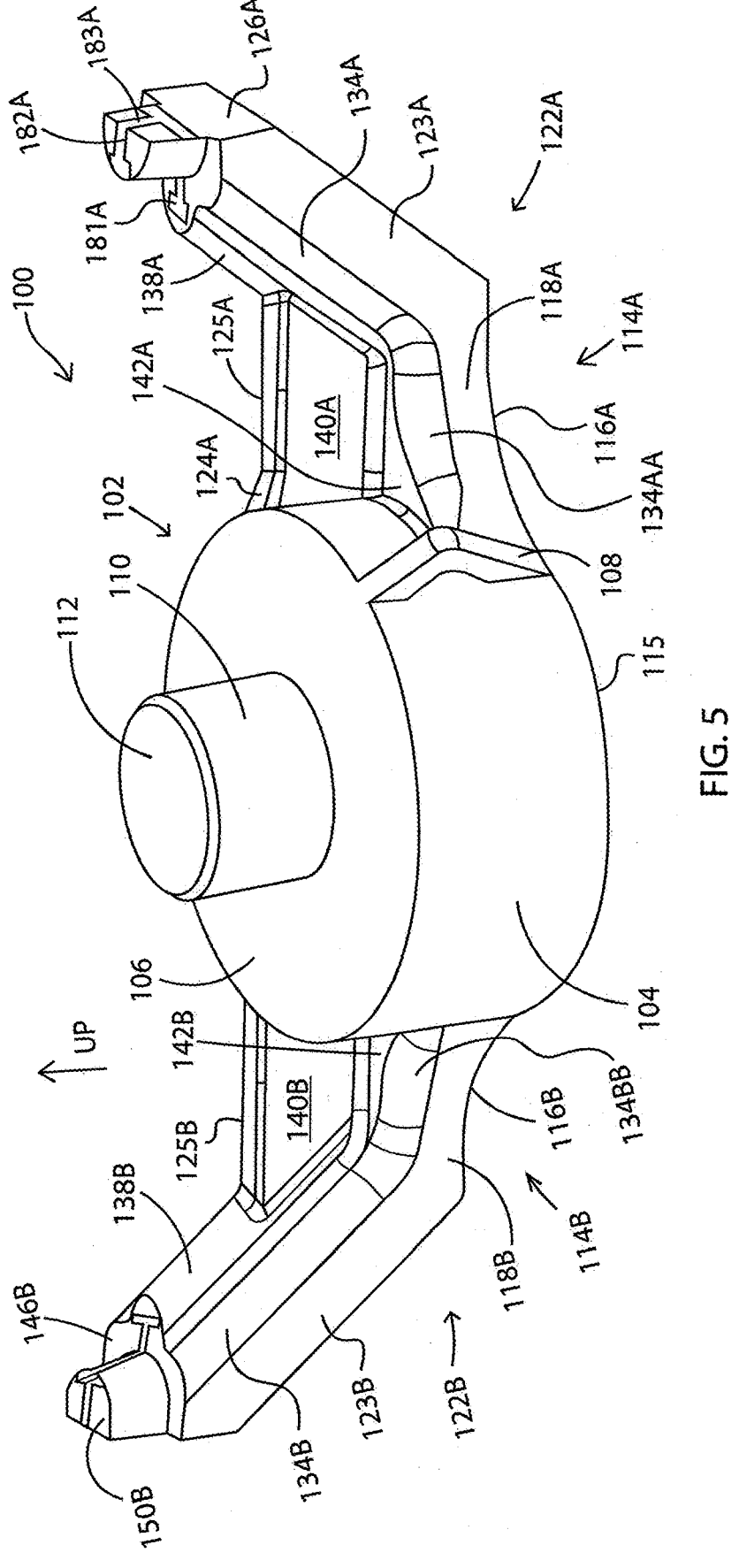
FIG. 5 is top-oriented perspective view of the front-side of the strap pack support tool in accordance with the present invention.

With reference to FIG. 5 (front-side of strap pack tool), a strap-pack-support tool 100 in accordance with the present invention has a cylindrically shaped main body 102 having a top planar platform 106. The top planar platform 106 is circular in shape and has a cylindrical hub 110 that extends in an upward direction indicated by arrow UP, with the cylindrical hub 110 being aligned with a center axis AA. Cylindrical hub 110 has a top 112. The side 104 of the main body 102 of the strap-pack-support tool 100 is defined by the circular shape of the top planar platform 106.

A first appendage section 114A is integrally connected to the side 104 of the main body 102 and has a front-side tapered bottom edge 116A. A first arm 122A has a front-side sidewall 123A that integrally connects to tapered sidewall 118A, with tapered sidewall 118A being defined by the tapered bottom edge 116A. A hook or eyelet 108, allowing the support tool 100, to be stored on a wall or rack, connects to the side 104 of the main body 102 just below the top planar platform 106 and above the front side bottom edge 115 of the main body 102.

Tapered sidewall 118A, which is understood to be the sidewall of the front-side tapered section of the first appendage section 114A, integrally connects to the side 104 of the main body 102. The front-side side wall 123A of first arm 122A angles upward and integrally connects to a first arm hub platform 146A.

A perpendicular sidewall 126A of first arm 122A is perpendicular to hub platform 146A and is integrally connected to front-side side wall 123A. Integrally connected to the front-side sidewall 123A is sloped outside wall 124A (FIG. 7) of first arm 122A. A reinforcing or support wall 140A of the first appendage section 114A integrally connects to side 104 of the main body 102 with the reinforcing wall 140A integrally connecting to central arm section 138A that connects to a central bell-shaped region of hub platform 146A.

The first appendage-side support wall 140A has a top having a sloped section 124A that extends downward from the side 104 of the main body 102, and a level section 125A which extends from the sloped section 124A to the central arm section 138A. Integrally connected to front side wall 123A of the first appendage section 122A is a front-side intermediate section 134A which is integrally connected to the first arm hub platform 146A and to a tapered intermediate section 134AA. The tapered intermediate section 134AA of the first appendage section 114A connects to the side 104 of the main body 102. A front-side valley region 142A of the first appendage section 114A is located between reinforcing wall 140A and first tapered section sidewall 118A, with a trough sloping upward from the front side valley region 142A to the hub platform 146A, with the trough being located between central arm section 138A and the front-side of the intermediate section 134A of the first arm 122A. Central arm section 138A connects to a bell-shaped region 148A of the first arm platform 146A.

Situated on hub platform 146A of the first arm 122A is first arm hub or lug 150A which is formed in a half circular, half cylindrical shape. The top end of the large diameter flange section 183A of I-beam 180 (FIG. 10) is located within the first arm hub 150A and is flush with the perpendicular sidewall 126A of the first arm 122A. The top of the small diameter flange 182A of I-beam 180 is flush with the top of first arm hub 150A.

Still with reference to FIG. 5, a second appendage section 114B is integrally connected to the side 104 of the main body 102 and has a front-side tapered bottom edge 116B. A second arm 122B has a front-side sidewall 123B that integrally connects to tapered sidewall 118B, with sidewall 118B being defined by the tapered bottom edge 116B. Second appendage section 114B and second support arm 122B are oriented 180 degrees apart from the first appendage section 114A and first support arm 122A.

Tapered sidewall 118B, which is understood to be the sidewall of the front-side tapered section of the second appendage section 114B, integrally connects to the side 104 of the main body 102. The front-side side wall 123B of second arm 122B angles upward and integrally connects to a second arm hub platform 146B. A perpendicular sidewall 126B of second arm 122B is perpendicular to second hub platform 146B and is integrally connected to front-side side wall 123B of the second appendage section 116B. Integrally connected to the front-side sidewall 123B is sloped outside wall 124B (FIG. 7) of second arm 122B. A reinforcing or support wall 140B of the second appendage section 114B integrally connects to side 104 of the main body 102 with the reinforcing wall 140B integrally connecting to central arm section 138B that connects to a central bell-shaped region of hub platform 146B of the second arm 122B.

The second appendage-side support wall 140B has a top having a sloped section 124B that extends downward from the side 104 of the main body 102, and a level section 125B which extends from the sloped section 124B to the central arm section 138B. Integrally connected to front side wall 123B of the second appendage section 122B is a front-side intermediate section 134B which is integrally connected to the second arm hub platform 146B and to a tapered intermediate section 134BB of the second appendage section 114B. The tapered intermediate section 134BB of the second appendage section 114B connects to the side 104 of the main body 102.

A front-side valley region 142B of the second appendage section 114B is located between reinforcing wall 140B and second tapered section sidewall 118B, with a second appendage section front-side trough sloping upward from the front side valley region 142B to the hub platform 146B, with the trough being located between central arm section 138B and the front-side of the intermediate section 134B of the second arm 122B.

Situated on second hub platform 146B of the second arm 122B is second arm hub or lug 150B which is formed in a half circular, half cylindrical shape. The top end of a second large diameter flange section 183 of I-beam 180 (FIG. 10) located within the second rm hub 150B is flush with perpendicular sidewall of the second arm 122B. The top of the small diameter flange 182 of second I-beam 180 is flush with the top of second arm hub 150B.

Figure 6:
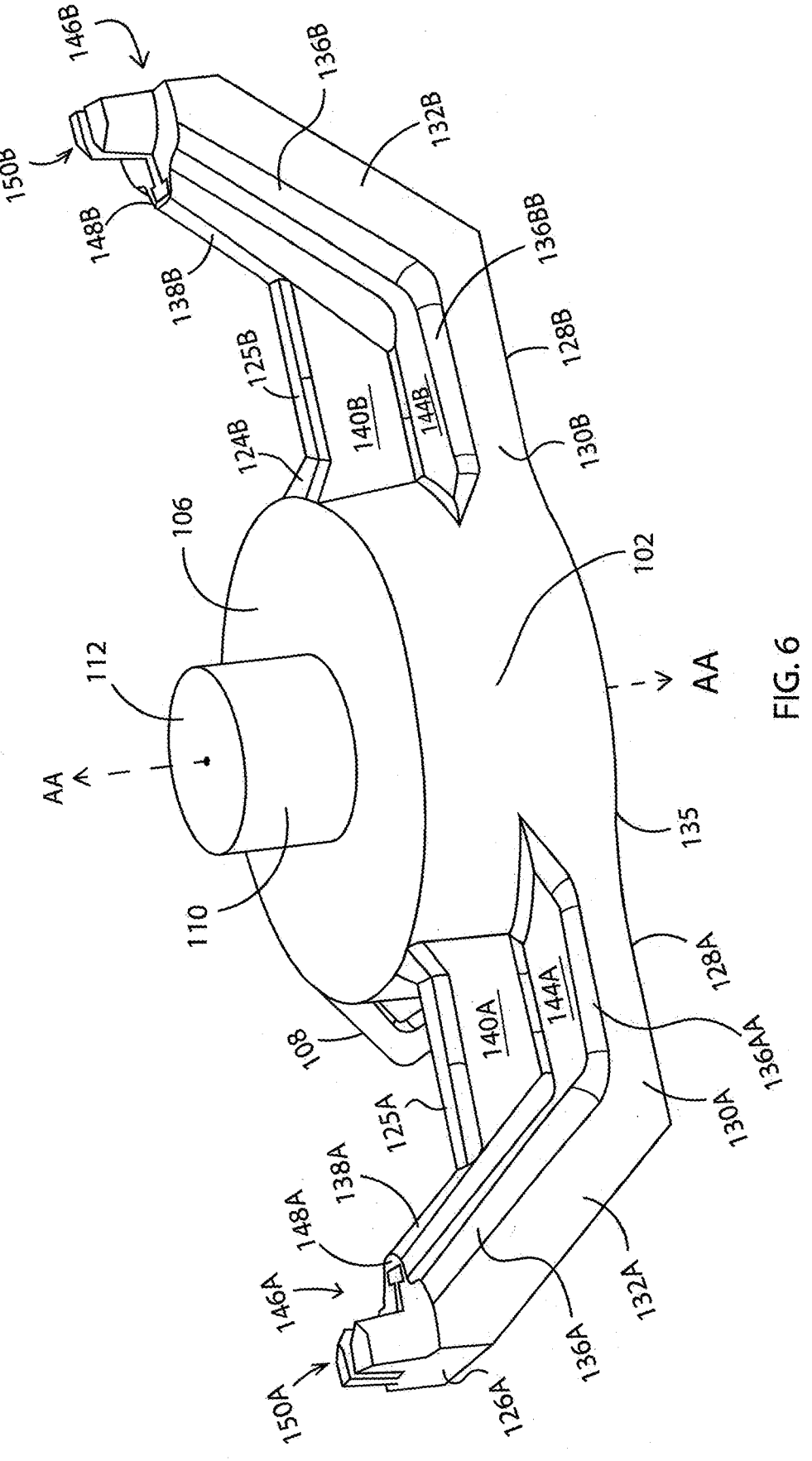
FIG. 6 is top-oriented perspective view of the rear-side of the strap pack support tool in accordance with the present invention.

With reference to FIG. 6 (rear-side of support tool 100), the first appendage section 114A is integrally connected to the side 104 of the main body 102 and has a rear-side tapered bottom edge 128A. The first arm 122A has a rear-side sidewall 132A that integrally connects to rear-side tapered sidewall section 130A, with rear-side tapered sidewall section 130A being defined by the tapered bottom edge 128A.

Rear-side tapered sidewall 130A, which is understood to be the sidewall of the rear-side tapered section of the first appendage section 114A, integrally connects to the side 104 of the main body 102. The rear-side side wall 132A of first arm 122A angles upward and integrally connects to a first arm hub platform 146A. As appreciated from both FIG. 5 and FIG. 6., a perpendicular sidewall 126A of first arm 122A is perpendicular to first hub platform 146A and is integrally connected to rear-side side wall 132A.

Integrally connected to the rear-side sidewall 132A is sloped outside wall 124A (FIG. 7) of first arm 122A. The rear perspective view of FIG. 6 shows reinforcing or support wall 140B of the first appendage section 114A integrally connects to side 104 of the main body 102 with the reinforcing wall 140B integrally connecting to central arm section 138A that connects to a central bell-shaped region 148A of hub platform 146A.

Integrally connected to rear side wall 123A of the first appendage section 122A is a rear-side intermediate section 136A which is integrally connected to the first arm hub platform 146A and to a tapered intermediate section 136AA. The tapered intermediate section 136AA of the first appendage section 114A connects to the side 104 of the main body 102. A rear-side valley region 144A of the first appendage section 114A is located between reinforcing wall 140A and tapered rear section sidewall 130A, with a rear first-appendage side trough sloping upward from the rear side valley region 144A to the hub platform 146A, with the trough being located between central arm section 138A and the sloped rear-side sidewall 136A of the first arm 122A. Central arm section 138A connects to a bell-shaped region 148B of the first arm platform 146A.

Situated on hub platform 146A of the first arm 122A is first arm hub 150A which is formed in a half circular, half cylindrical shape. The top end of the large diameter flange section 183A of I-beam 180 (FIG. 10) located on a side the first arm hub and is flush with the perpendicular sidewall of the first arm 122A. The top of the small diameter flange 182A of I-beam 180 is flush with the top of first arm hub 150A.

Still with reference to FIG. 6, the second appendage section 114B is integrally connected to the side 104 of the main body 102 and has a rear-side tapered bottom edge 128B. The second arm 122B has a rear-side sidewall 132B that integrally connects to rear-side tapered sidewall section 130B, with sidewall section 130B being defined by the tapered bottom edge 128B.

Tapered sidewall 130B, which is understood to be the sidewall of the rear-side tapered section of the second appendage section 114A, integrally connects to the side 104 of the main body 102. The rear-side side wall 132B of second arm 122B angles upward and integrally connects to a second arm hub platform 146B. As appreciated from both FIG. 5 and FIG. 6., a perpendicular sidewall 126B of second arm 122B is perpendicular to second hub platform 146B and is integrally connected to the rear-side side wall 132B of the second arm 114B. Integrally connected to the rear-side sidewall 132B is sloped outside wall 124B (FIG. 7) of second arm 122B. The rear perspective view of FIG. 6 shows reinforcing or support wall 140B of the second appendage section 114B integrally connects to side 104 of the main body 102 with the reinforcing wall 140B integrally connecting to central arm section 138B that connects to a central bell-shaped region 148B of the hub platform 146B.

Integrally connected to rear side wall 132B of the second appendage section 114B is a rear-side intermediate section 136B which is integrally connected to the second arm hub platform 146B and to a tapered intermediate section 136BB. The tapered intermediate section 136BB of the second appendage section 114B connects to the side 104 of the main body 102. A rear-side valley region 144B of the second appendage section 114B is located between reinforcing wall 140B and tapered rear section sidewall 130B, with a rear second-appendage side trough sloping upward from the rear side valley region 144B to the hub platform 146B, with the trough being located between central arm section 138B and the sloped rear-side sidewall 136B of the second arm 122B. Central arm section 138A connects to a bell-shaped region 148B of the second arm platform 146B. Situated on hub platform 146B of the second arm 122A is second arm hub 150B which is formed in a half circular, half cylindrical shape.

The top end of the large diameter flange section 183 of I-beam 180 (FIG. 10) is located on a side the second arm hub and is flush with the perpendicular sidewall of the second arm 122B. The top of the small diameter flange 182A of I-beam 180 is flush with the top of second arm hub 150B.

Figure 7:
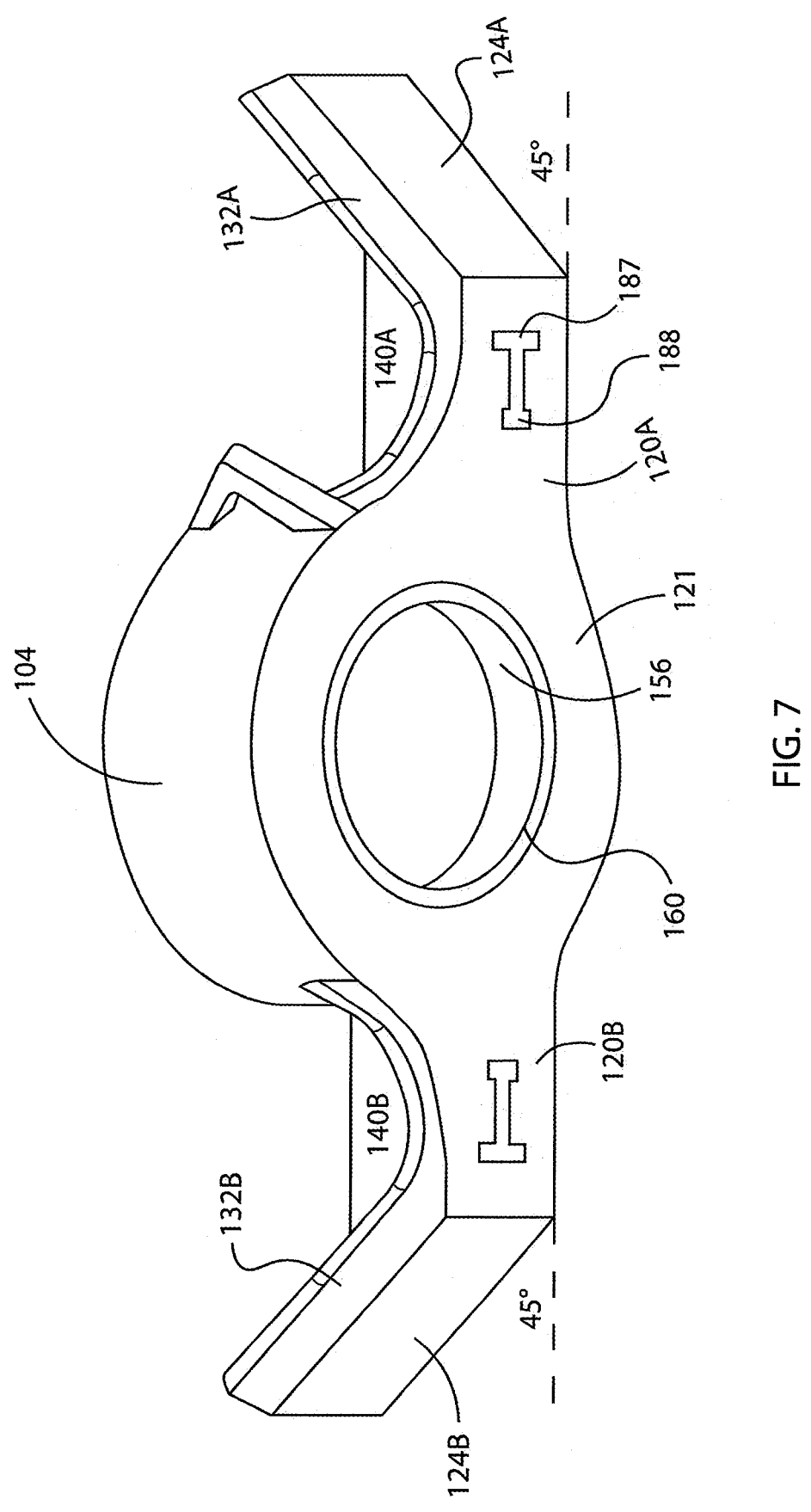
FIG. 7 is a bottom-oriented perspective view of the strap pack support tool in accordance with the present invention with the bottom of the cylindrical sleeve being flush with the bottom of the side appendages and bottom of the main body.

With reference to FIG. 7, the first appendage section 114A has a bottom 120A, the main body 102 has a bottom 121A and the second appendage section has a bottom 120B. The bottom 120A of the first appendage section, the bottom 120B of the second appendage section and the bottom 121 of the main body are integrally connected and lie in the same plane. The respective bottoms 187, 188 of the I-beam 180 (FIG. 10) are positioned flush to the bottom 120A and 120B.

The sloped outside wall 124A of the first support arm 122A rises at a 45-degree angle from the bottom 120A of the first appendage section 114A. The sloped outside wall 124B of the second support arm 122B rises at a 45-degree angle from the bottom 120B of the second appendage section 114B. The sloped outside wall 124A of the first support arm 122A abuts the rear side wall 132A of the first support arm 122A and the sloped outside wall 124B of the second support arm 122B abuts the rear side wall 132B of the second support arm 122B.

In FIG. 7, the bottom 160 of cylindrical sleeve 156, which is positioned with the main body 102. is flush with the bottom 121 of the main body 102.

Figure 8:
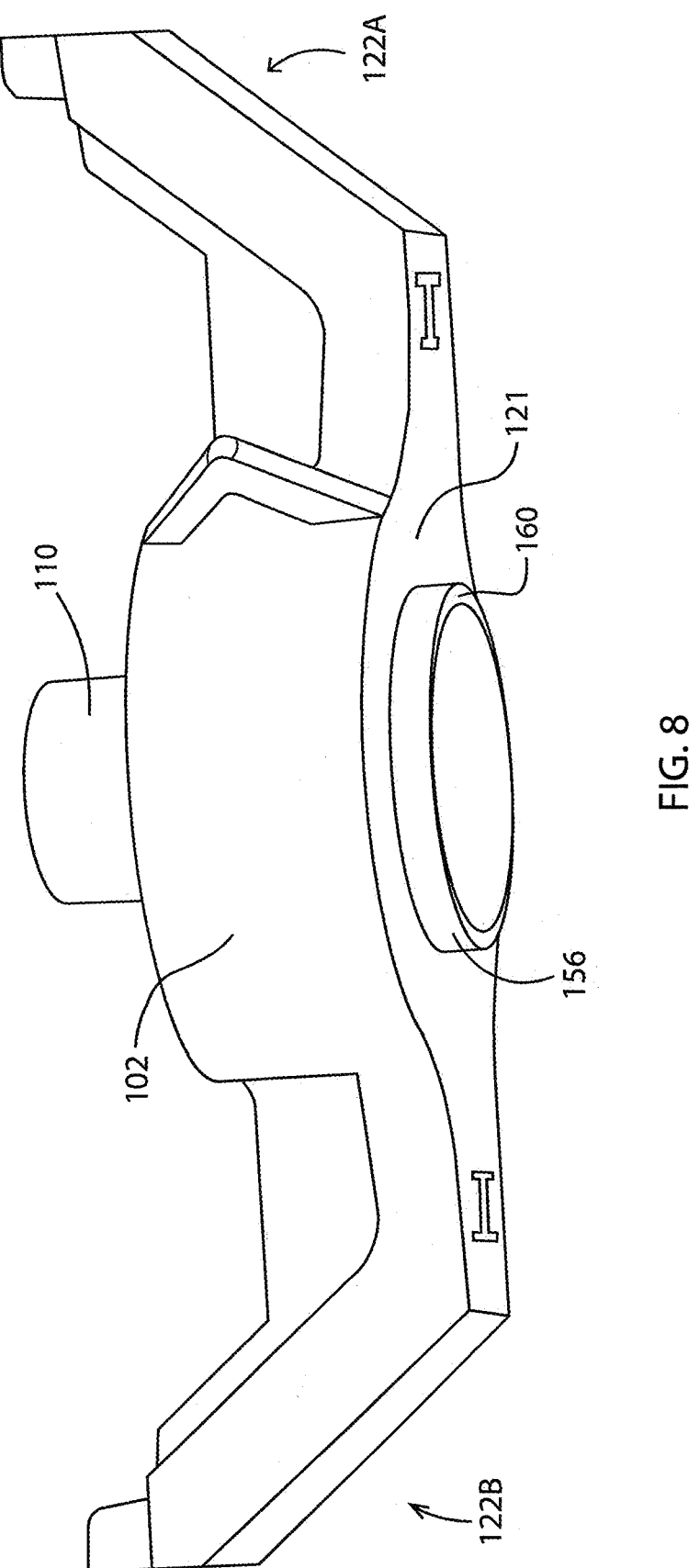
FIG. 8 is a bottom-oriented perspective view of the strap pack support tool in accordance with the present invention with the bottom of the cylindrical sleeve extending outward from the bottom of the main body.

In FIG. 8, the bottom 160 of cylindrical sleeve is 156 demonstrated to be extendable to a position below the surface of the bottom 121 of the main body 102.

Figure 9:
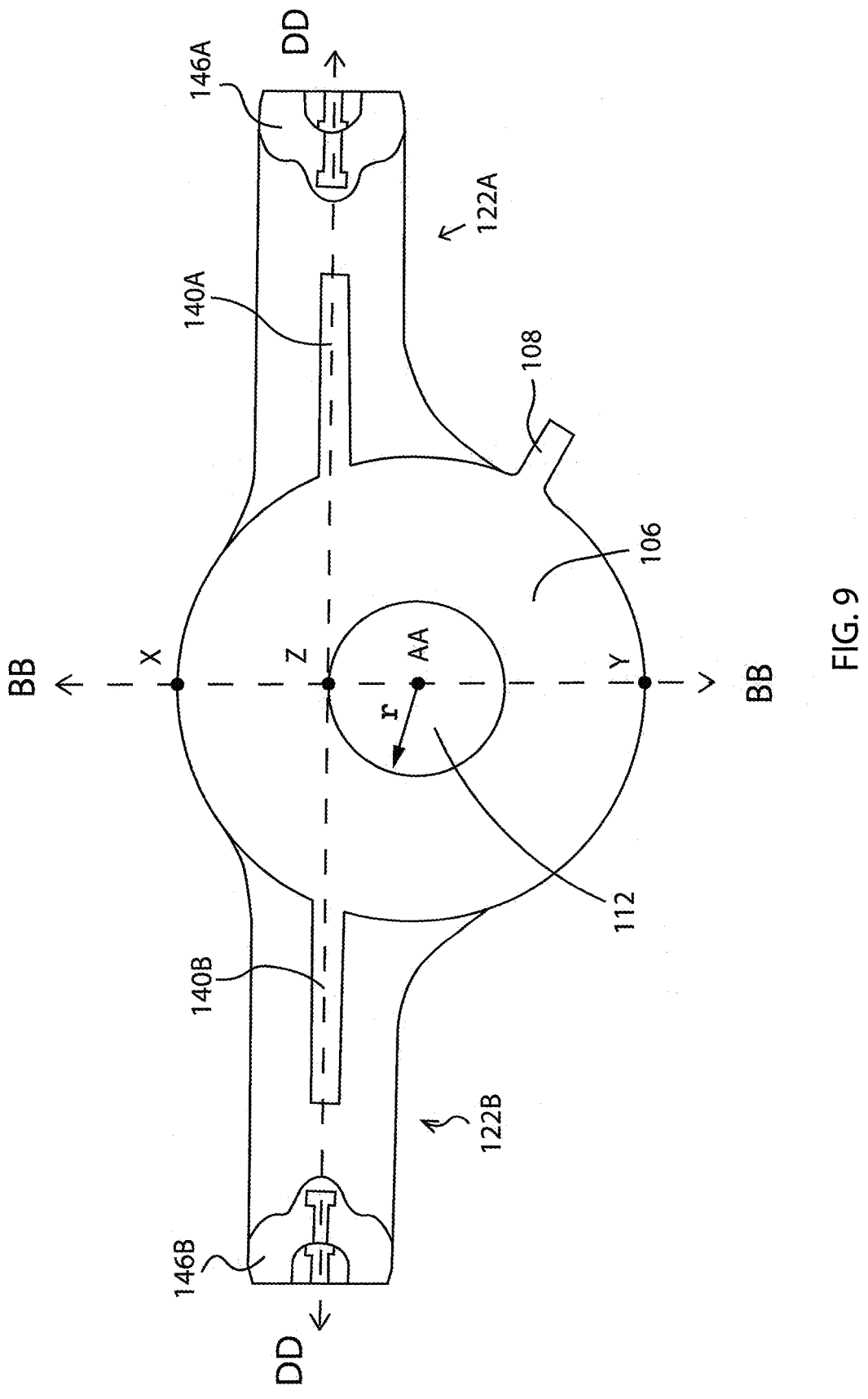
FIG. 9 is a top view of the strap pack support tool of the present invention.

In FIG. 9, the top 112 of the cylindrical hub 110 is positioned on the main body 102 such that Axis AA which extends through the center of cylindrical hub 110 is equal distant from point X located at the rear edge of the top planar platform 106 and from point Y located on the front edge of the top planar platform 106.

The shortest distance from point X to point Y represents the diameter of the top planar platform 106. A plane BB, which extends through axis AA is in perpendicular orientation to plane DD, with plane DD extending through the center of hub platform 146A of the first support arm 122A and through the center of hub platform 146B of the second support arm 122B, with the center of the respective hub platforms 146A, 146B, including the respective bell-shaped regions 148A, 148B.

Still with reference to FIG. 9, point Z is positioned on the planar platform 106 and is intersected by a straight-line that extends across the top planar platform from point X to point Y. The cylindrical hub 110 has a has a radius r, with the shortest distance from axis AA to point Z being radius r of the cylindrical hub 110. Thus, plane DD is offset the distance of radius r from the axis AA, with plane DD extending through the tops 125A, 125B of support walls 140A, 140B, respectively and extending through hub platforms 146A and 146B.

Figure 10:
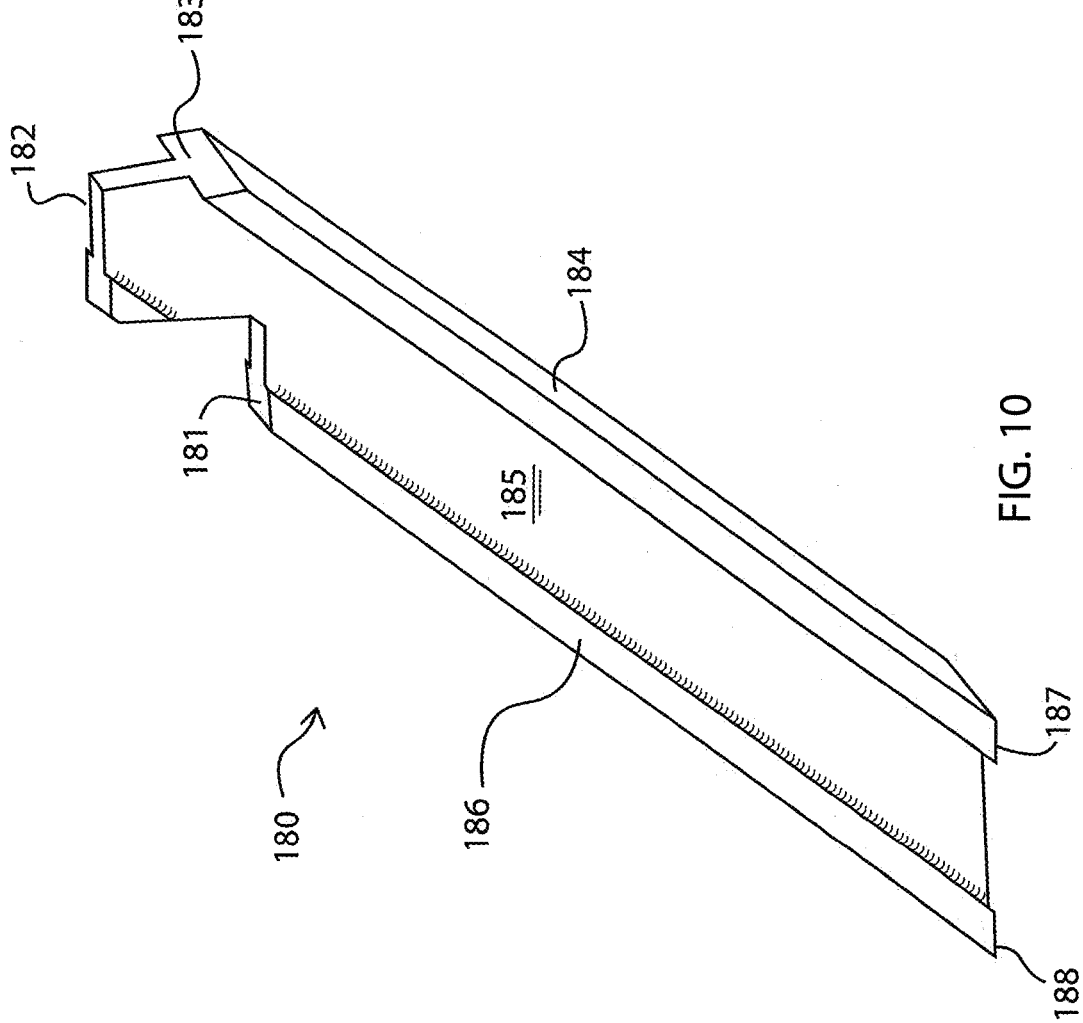
FIG. 10 is a perspective view of an I-beam as used in the support arms of the present invention.

With reference to FIG. 10, an I-beam 180 in accordance with the present invention provides structural support and reinforcement to support arms 122A and 122B, with each of the support arms having a respective I-beam 180. Each I-beam has a center section 185 that is sloped to accommodate the shape and angular rise of the support arms. The top 182 of each I-beam 180 is positioned within the respective arm hub platforms 150A, 150B. The top 181 of small diameter flange 186 of I-beam 185 is positioned flush to the respective surfaces of hub platforms 146A, 146B. The top end 183 of large diameter flange of I-beam 180 is flush with respective perpendicular sidewalls as demonstrated by perpendicular sidewall 126A (FIGS. 5 and 6). The bottom 188 of small diameter flange 186 and the bottom of large diameter flange 184 are positioned flush to the bottom of the respective first and second appendage sections 120A, 120B.

Figure 11:
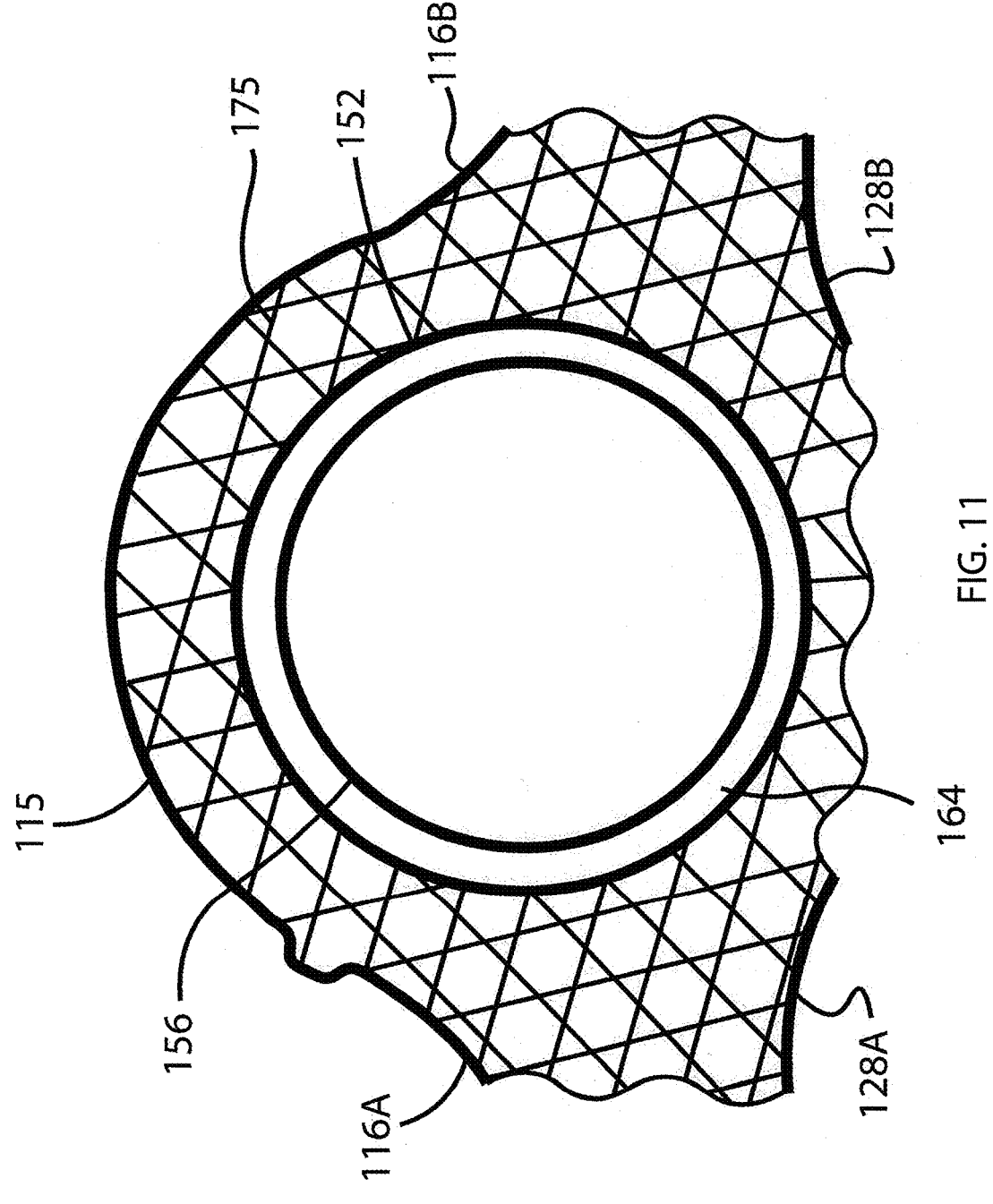
FIG. 11 is a bottom-oriented side perspective view of the strap back support tool of the present invention, with bottom skin or shell removed, showing the honeycomb interior structure.

With reference to FIG. 11, the bottom 121 of the main body 102 is depicted with the surface or shell of the bottom 121 removed so as to expose the interior honeycomb structure 175 that extends throughout the interior of the strap pack support tool 100. Cylindrical sleeve 156 is separated by gap 164 from cylindrical interior wall 152. The honeycomb structure connects to the edge 115 of the front side of the main body 102, the tapered front edges 116A, 116B of the first and second appendage sections. Still further, the honeycomb structure 175 connects to the tapered bottom edges 128A, 128B and the interior wall 152 with the honeycomb structure 175 being understood to extend throughout the interior of the strap pack support tool 100.

Figure 12:
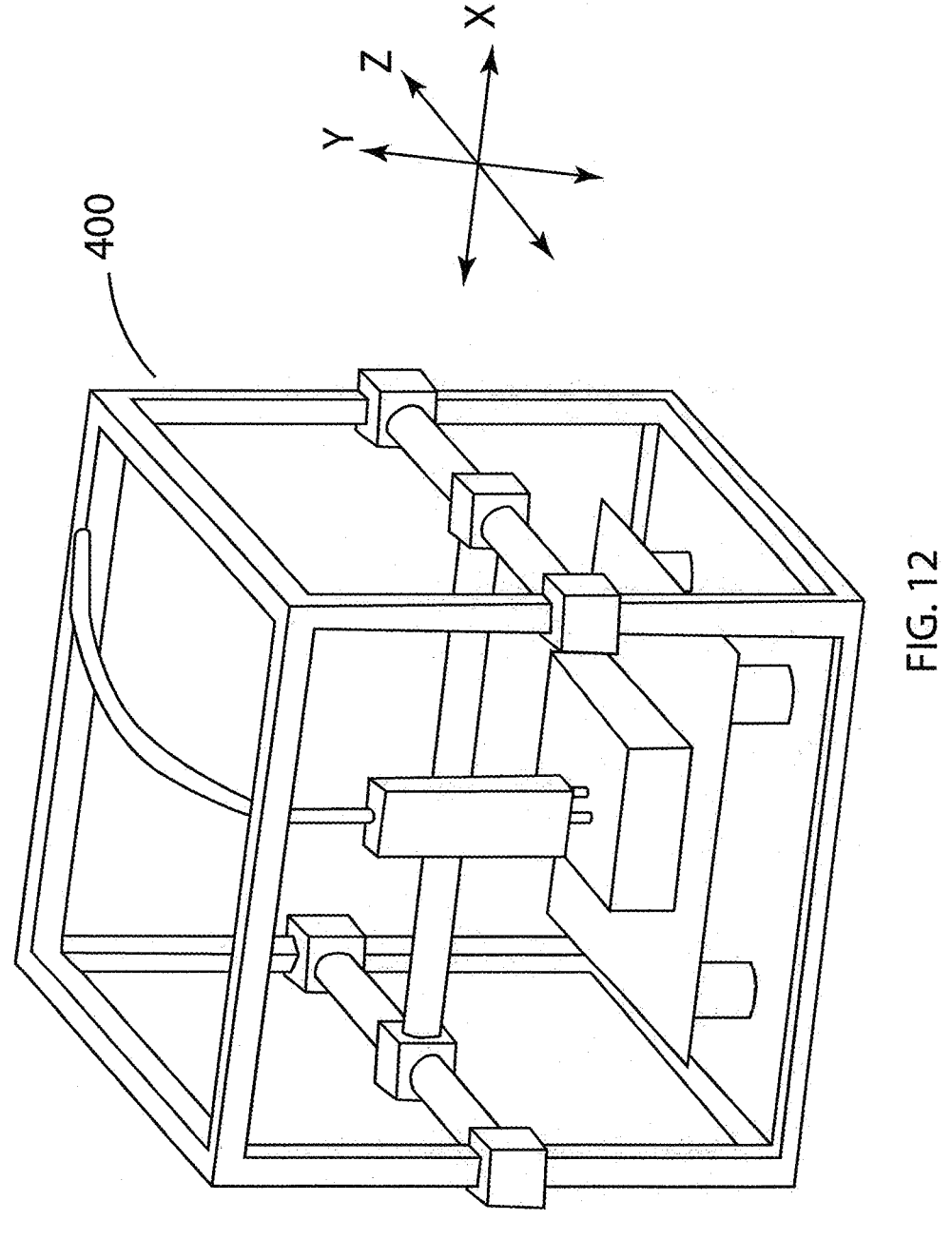
FIG. 12 is 3D printing machine which utilizes fused filament fabrication for manufacturing the strap pack support tool of the present invention.

In FIG. 12, an additive manufacturing machine 400 is depicted. The prototype of the present invention was made with by additive manufacturing utilizing thermoplastic material to create the strap pack support tool by a fused filament fabrication (FFF) 3D printing process.

Figure 13:
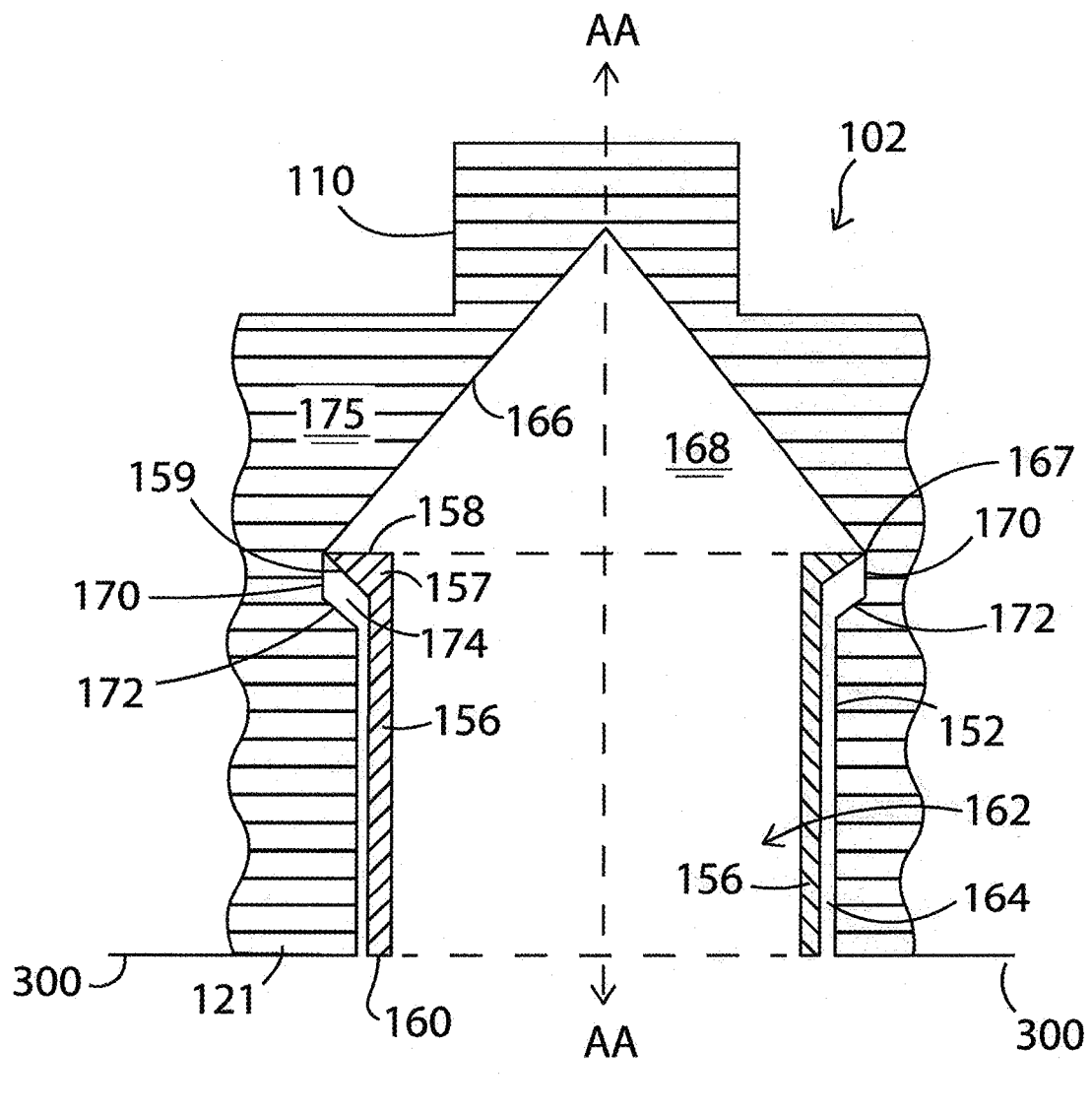
FIG. 13 is a cross-sectional view of the main body of the strap pack support tool of the present invention having a cylindrical wall that forms a main cavity in which is situated a cylindrical sleeve that forms an interior cavity.

In FIG. 13, a cross-sectional view of the main body 102 of the strap pack support tool 100 of the present invention demonstrates that a gap 164 lies between a cylindrical sleeve 156 and cylindrical inner wall 152. A solid roof 166 below the cylindrical hub 110 defines an upper conical cavity which is positioned above an inner cylindrical cavity 162 defined by cylindrical sleeve 156. The inner cylindrical wall connects to a recessed wall 170 that connects to the bottom edge 167 of roof 166. The cylindrical sleeve 156 has a projecting section 157 having a top 158 and an angled edge 159. A recessed cavity 174 is defined by the angled edge 159, the recessed wall 170 and sloped wall 172. In FIG. 13, the bottom 160 of cylindrical sleeve is supported by flat surface 300 as is the bottom 121 of the main body 102. The flat surface 300 prevents the downward movement of the cylindrical sleeve.

Figure 14:
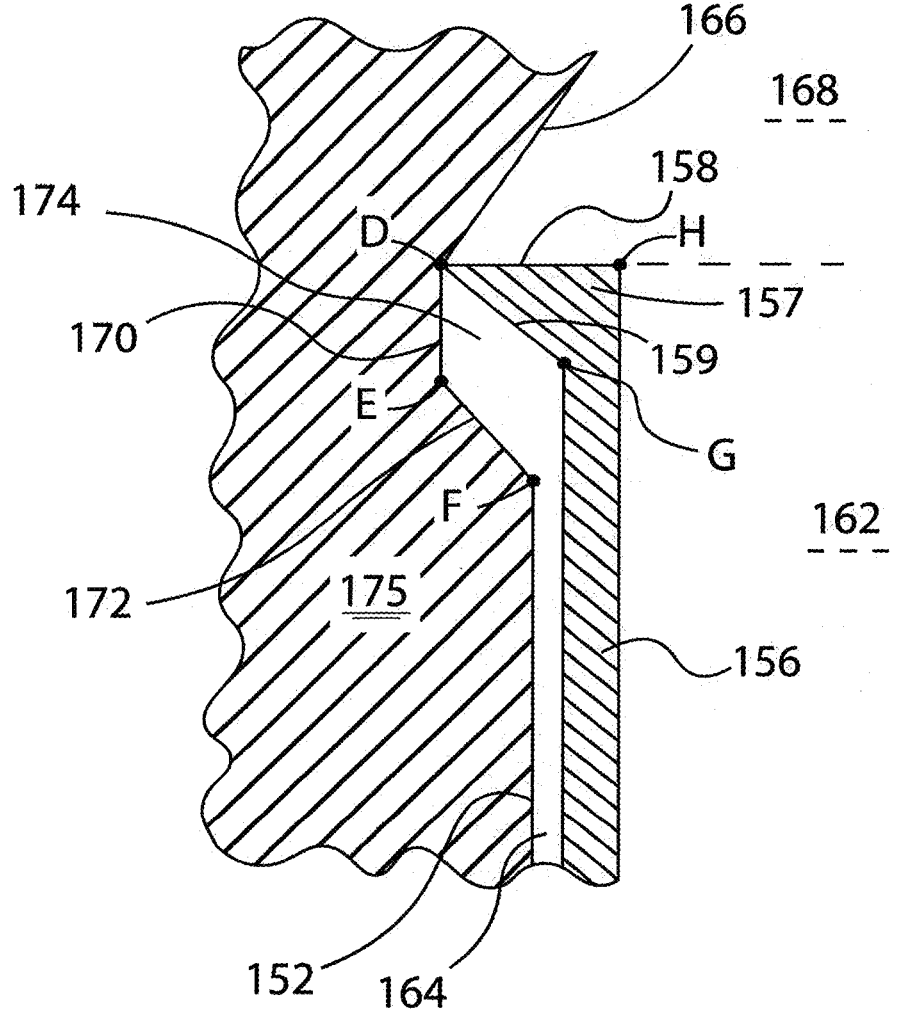
FIG. 14 is blow-up cross-sectional view of the projecting section of the cylindrical sleeve in relation to the interior recessed wall and sloped wall, which are positioned above the interior cylindrical wall, to form a recessed space.

With reference to FIG. 14, the projection section 157 of cylindrical sleeve 156 has points D and H that lie on the flat surface at the top of the cylindrical sleeve 156. Points D and F are end points of the sloped wall 172. Points D and E are end points of the recessed wall 170. The geometry of the recessed wall 170, sloped wall 172, and angled edge 159 of the cylindrical sleeve 156 allow the cylindrical sleeve to move axially up and down along the axis AA (FIG. 13) with the extent of such movement being limited by the bottom edge 167 of roof 166 and the top edge (at point E) of sloped wall 172.

According to programmed instructions in making the prototype of the present invention, thermoplastic material was diffused from a heated nozzle and stacked layer, upon layer in designated X-Y-Z directions from the bottom up. Although the entire strap pack support tool 100 is made of the same material, the machine 400 was programmed to create the I-beams 180 and cylindrical sleeve 140 apart from the rest of the tool.

The honeycombed interior 175 and skin of the tool are created in a programmed process so that the interior wall 130 surrounds the cylindrical sleeve 140 and the I-beams 180 are surrounded by and connect to the honeycombed interior of the respective support arms 122, 124.

In the additive manufacturing machine used to make the prototype of the present invention, as the printer melts the plastic filament (thermoplastic material) and then deposits it into the appropriate shape/location, the physical width of that pool of melted filament was 0.02". In programmed steps, the machine traces the outermost contour before coming back and cross-hatching the interior with the honeycomb infill pattern.

The machine operator adjusts how many lines of contour the machine will draw, thereby defining the thickness of the outer shell of the part. In the process used in the manufacture of the prototype of the present invention, each pass of the nozzle equated to 0.02" and each successive perimeter trace added an additional 0.02" to the thickness of the outer shell. In the prototype of the present invention, the outer shell was constructed from 2 contours, making it 0.04" thick.

In the prototype of the present invention, as the additive manufacturing machine added more layers in an upward stepped progression, the shell on the respective arms formed into a rounded dome-like shape. This results because the outer perimeter contours are tapered with the addition of every successive layer such that the combined terraces of layers result in the rounded dome like appearance on the exterior of the arms.

Although the prototype of the present invention was made by additive manufacturing, the invention can be created by other processes and, as such, the invention is not limited to one type of manufacturing method.

Figure 15:
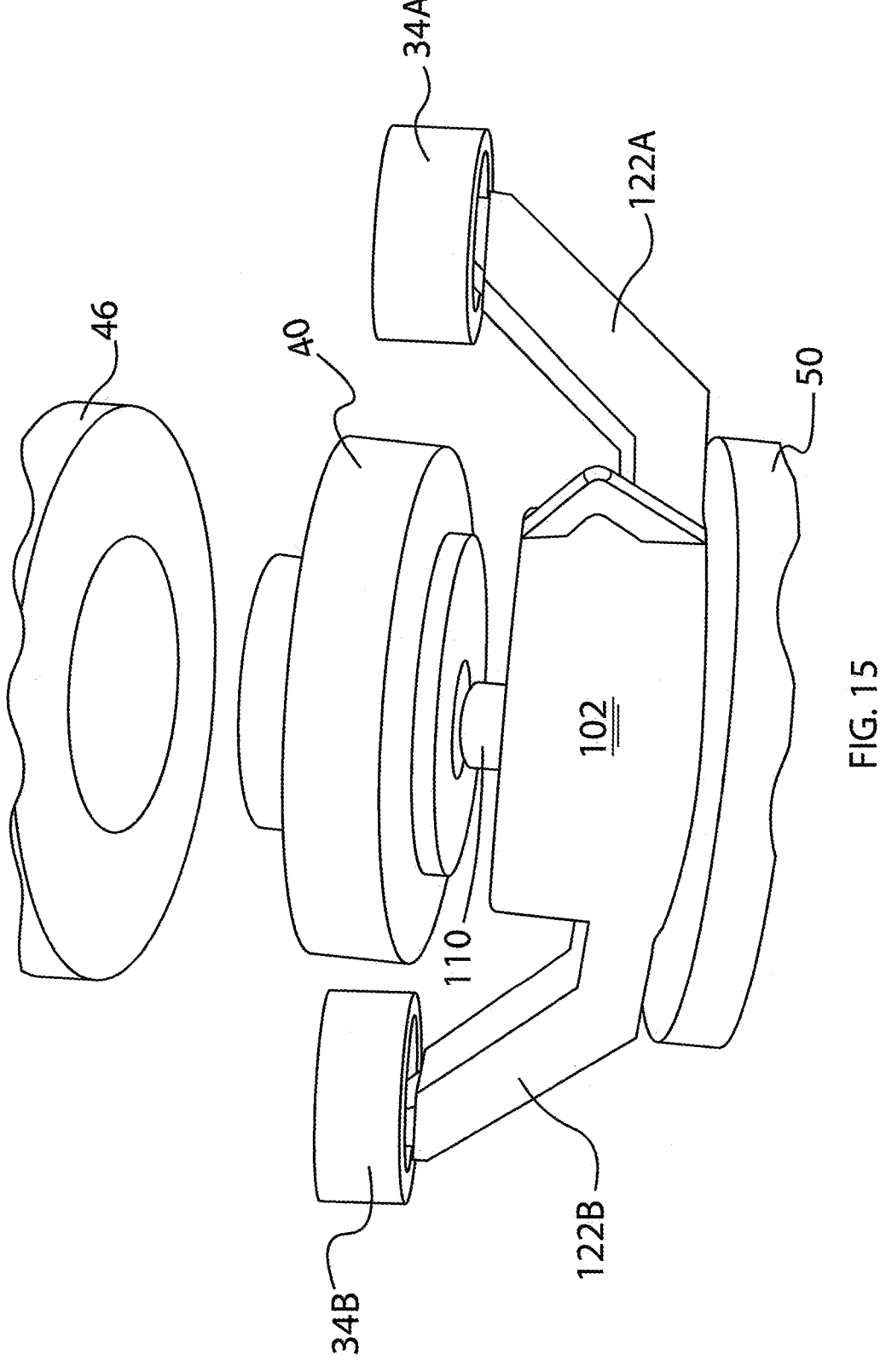
FIG. 15 is an exploded view depicting the strap pack support tool of the present invention as it connects to a strap pack and damper rods to provide stabilizing support when rotor hub maintenance operations are performed.

With reference to FIG. 15, when in use, the strap pack support tool 100 is positioned such that the upper lip of the lower flange 220 of strap pack housing extends into the inner cavity 162 within the cylindrical walls of sleeve 156. The cylindrical hub 110 on the top platform 106 of the main body 102 of the strap pack support tool 100 extends through the aperture 40 of the strap pack 200. The arm hubs 162A, 162B that extend from the respective arms 122, 124 are secured to the connecting ends of the dampers 34A, 34B, with the connecting ends of the dampers having been disconnected from the apertures 60A, 60B of shoe 56.

With the strap pack support tool securely supporting the strap pack and the dampers, safe and efficient repairs can proceed with the rotor hub of a helicopter, with the tool allowing for safer conditions and quicker repair times.

Various modifications and embodiments of the invention may be made by those skilled in the art without departing from the scope and spirit of the foregoing disclosure. Accordingly, the scope of the invention is limited only by the following claims.

What is claimed is:

1. A strap pack support tool for helicopter maintenance, comprising:
a main body having a top platform from which a hub extends in an upward direction, said hub being centered on a center axis;
a first side appendage connected to the main body;
a first arm extending from the side appendage;
a first arm platform at an end of said first arm, said first arm platform connecting to a first arm hub that extends in the upward direction;

a second side appendage connected to the main body;
a second arm extending from the second side appendage;
a second arm platform at an end of said second arm, said second arm platform connecting to a second arm hub that extends in the upward direction;
an interior wall that forms a main cavity within said main body.

2. The strap pack support tool for helicopter maintenance according to claim 1, further comprising:
a sleeve positioned radially inward from said interior wall as measured by said center axis, said sleeve forming an inner cavity.

3. The strap pack tool for helicopter maintenance according to claim 2, further comprising:
a roof defining the shape of an upper cavity, said roof connecting to a recessed wall at a lowest edge of the roof, with the upper cavity connecting to the main cavity.

4. The strap pack tool for helicopter maintenance according to claim 3, wherein:
said sleeve has a projecting section having a top and an angled edge.

5. The strap pack tool according to claim 4, wherein:
the lowest edge of the roof restricts upward movement of the sleeve, and a sloped wall of the main body restricts downward movement of the sleeve.

6. The strap pack support tool according to claim 5, wherein:
the roof is located within the main body and below the top platform of the main body.

7. The strap pack support tool according to claim 6, wherein:
a first support beam is positioned within the first arm extending from a bottom of the first side appendage to the first arm hub; and
a second support beam is positioned within the second arm extending from a bottom of the second side appendage to the second arm hub.

8. The strap pack tool for helicopter maintenance, according to claim 7, wherein:
said strap pack tool is made of thermoplastic.

9. The strap pack tool for helicopter maintenance according to claim 8, wherein:
the roof, the first arm, the second arm, the interior wall, the main body, and the hub are connected to a honeycombed interior structure;
said interior wall that forms the main cavity within said main body is a cylindrical interior wall;
said sleeve is a cylindrical sleeve; and
said roof is shaped such that the upper cavity forms a conical shape.

10. A strap pack support tool for helicopter maintenance, comprising:
a main body having a side defined by a top circular platform;
a circular hub positioned on the top circular platform of the main body with an axis extending through a center of the top circular platform and through a center of the circular hub, with the circular hub having a radius having a radial distance;
a first appendage section connecting to the side of the main body, said first appendage section having a first support arm, with said first support arm having a first arm hub platform having a first arm hub;
a second appendage section connecting to the side of the main body in an opposite direction from the first appendage section, said second appendage section having a second support arm having a second arm platform having a second arm hub;

a first appendage support wall connecting to the side of the main body and to the first support arm;

a second appendage support wall connecting to the side of the main body and to the second support arm; and wherein:

the first appendage support wall and the first arm hub platform, and the second appendage support wall and the second arm hub platform are oriented so that a plane which is normal to a rear most edge of the circular hub extends through the first appendage support wall, the first arm hub platform, the second appendage support wall, and the second arm hub platform, with the plane being offset the radial distance from the axis that extends through the center of the circular hub.

11. The strap pack support tool for helicopter maintenance of claim 10, further comprising:

an inner cylindrical cavity formed by a cylindrical interior wall located below the circular hub on the top circular platform, with a bottom of the cylindrical interior wall being part of a bottom of the main body.

12. The strap pack support tool for helicopter maintenance of claim 11, further comprising:

a cylindrical sleeve positioned within the cylindrical interior wall, with a gap separating the cylindrical sleeve from the cylindrical interior wall, with the cylindrical sleeve having a top projecting section, with axial movement of the cylindrical sleeve being restricted by a length of a recessed wall located radially outward from the cylindrical interior wall;

an interior roof positioned above the cylindrical sleeve and defining a conical cavity; and a bottom of the first appendage section and a bottom of the second appendage section lie in the same plane as the bottom of the main body.

13. The strap pack support tool for helicopter maintenance of claim 11, wherein:

the first appendage section has a first-appendage front-tapered bottom edge defining a first-appendage-section tapered front sidewall that connects to a front sidewall of the first support arm of the first appendage section;

the first appendage section has a front side tapered intermediate section that connects to a front side intermediate section;

the second appendage section has a second-appendage front-tapered bottom edge that defines a second appendage section tapered front sidewall that connects to a front sidewall of the first support arm of the first appendage section;

a valley section is connected to side of the main body and is positioned between the tapered intermediate section and the support wall of the first appendage section, with the support wall of the first appendage section connecting to a central arm section that connects to the first arm hub platform of the first arm hub.

14. The strap pack support tool of claim 13 further comprising:

an I-beam extending from the first arm hub to the bottom of the first appendage section.

15. The strap pack support tool of claim 14, wherein:

the I-beam has a top located within the first arm hub, with a top of a large diameter flange of the I-beam being flush with a perpendicular sidewall of the first support arm.

16. The strap pack support tool of claim 15, wherein:

a bottom end of the I-beam is flush with the bottom of the first appendage section.

17. The strap pack support tool of claim 16, wherein:

an interior area of the strap pack support tool is of honeycomb construction.

18. The strap pack support tool of claim 17, wherein:

the strap pack support tool is made of a singular material.

19. The strap pack support tool according to claim 18, wherein:

the singular material is a thermoplastic material.

* * * * *